No. 740,612. Patented October 6, 1903.

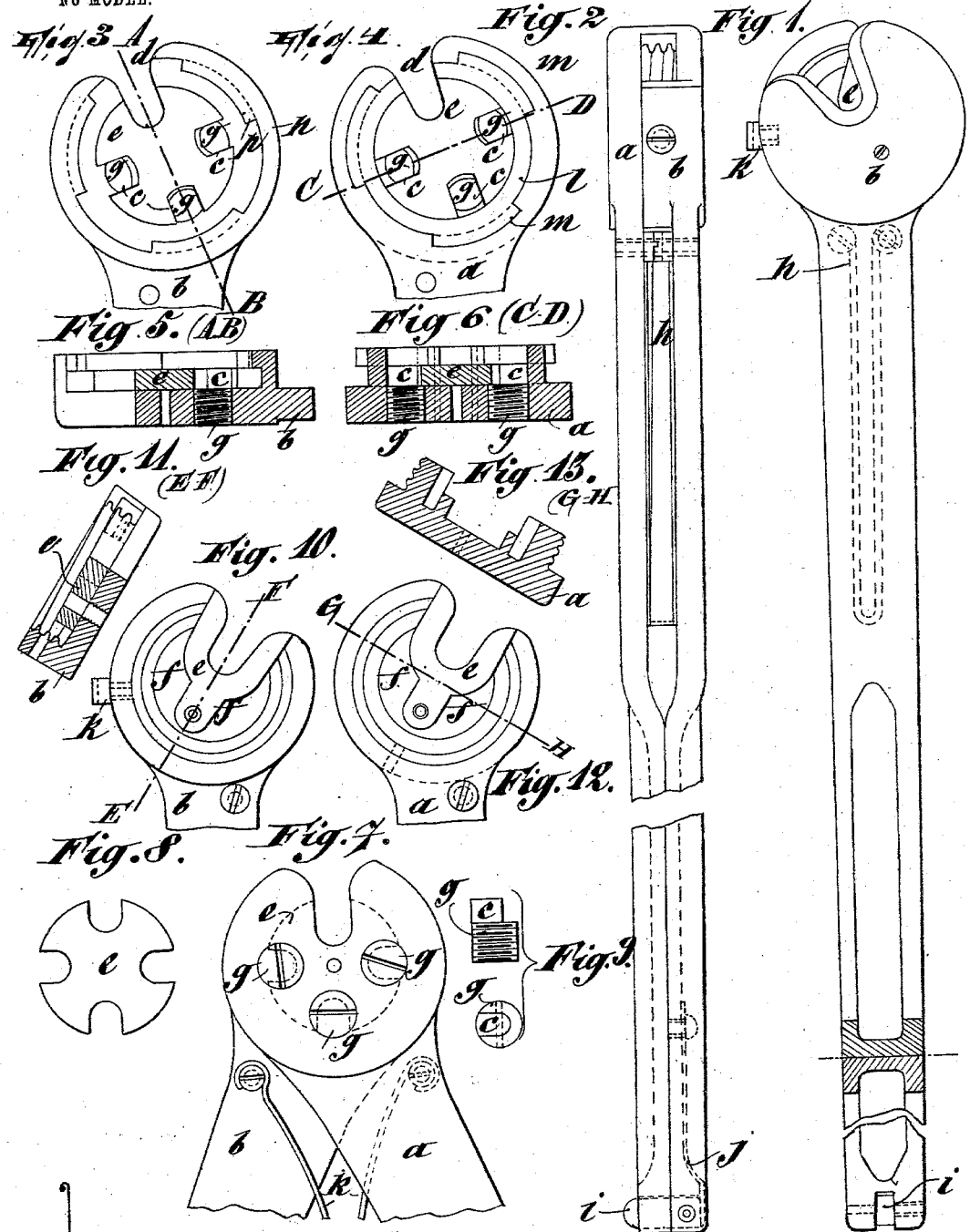

UNITED STATES PATENT OFFICE.

EDOUARD BAARTMANS, OF ANTWERP, BELGIUM.

WIRE OR LIKE CUTTER.

SPECIFICATION forming part of Letters Patent No. 740,612, dated October 6, 1903.

Application filed June 27, 1902. Serial No. 113,427. (No model.)

*To all whom it may concern:*

Be it known that I, EDOUARD BAARTMANS, manufacturer, a subject of the King of Belgium, residing at Antwerp, Belgium, No. 5 Rue Van Schoonbeke, have invented a new and useful Improvement in Wire or Like Cutters; and I do hereby declare the following to be a full, clear, and exact description of the same.

The present invention relates to a cutter for general use with interchangeable and multiple cutting edges for the cutting of metal wires and the like.

This cutter cuts wire at right angles to its axis without allowing the wire to slide between the cutting edges. This tool is easily separable and owing to the number of its cutters is of great durability. The exchange of the cutters is very simple.

My invention is fully illustrated in the accompanying drawings, in which—

Figure 1 is a face view of one form of the invention; Fig. 2, a side view thereof; Figs. 3 and 4, inside face views of the two members separated of another form of the tool. Figs. 5 and 6 are respectively sectional views on the lines A B, Fig. 3, and C D, Fig. 4. Fig. 7 is an outer face view of said other form of the tool, showing the members open ready to receive the object to be cut. Figs. 8 and 9 are detail views illustrating one of the cutters and a securing-screw therefor for said other form of the tool. Figs. 10 and 11 are respectively an inside face view and a sectional view on the line E F in Fig. 10 of one of the members of the device shown in Figs. 1 and 2; and Figs. 12 and 13 are respectively an inside face view and a sectional view on the line G H in Fig. 12 of the other member of the device as shown in Figs. 1 and 2.

Two levers $a$ and $b$, Figs. 3, 4, 5, and 6, of any suitable form carry at their ends extensions or enlargements in the form of casings of different diameters but of the same height or thickness. The bottom of these casings is pierced with three screw-threaded openings, with which engage three screws $g$, Figs. 9 carrying projecting studs $c$. A radial slot or opening $d$ is formed in the bottom and in the lateral walls of the casings. The lateral walls $l$ of the casing of the lever $a$ are provided with several projections $m$, which only extend upon the upper half of these walls, Figs. 4 and 6.

The lateral walls $n$ of the casing of the lever $b$ are provided with an equal number of projections $p$, which similarly do not extend beyond the upper half of the walls, Figs. 3 and 5. The dimensions of these casings and these projections are such that upon turning the casing of the lever $a$ upon that of the lever $b$ the projections $m$ come opposite to and enter the spaces between the projections $p$. On pressing the two casings together the projections $m$ and $p$ touch, respectively, the bottoms of the casings of the levers $b$ and $a$, and the two casings can then glide one upon the other. Each of the casings carries cutters $e$, shaped as indicated in Fig. 8 and having a height equal to half of the height of the lateral walls of the casing. The studs or pins $c$ prevent the cutters from turning with regard to the bases to which they are attached. All the receding edges of the cutters constitute cutting edges.

In using the apparatus, providing the projections $m$ are engaged between the projections $p$ so as to allow the two casings to glide one on the other, the casings are turned by means of the levers $a$ and $b$, so as to bring the openings $d$ into line with each other, between which the metal wire or object to be cut is then placed. Fig. 7 shows the apparatus in this position. Then upon pressing the levers together the cutters of the two casings move against each other upon the wire in the opening $d$, within which the cutting is effected.

A spring $h$ and stops (not shown) prevent the levers from turning at excessive angles.

When two cutting-faces are worn out, they can be replaced by others by partly turning the multiple cutters.

It is evident that one can modify in many ways the construction according to this invention, which consists, essentially, in turning in opposite directions about their common axis the operating-levers of the tool, having a casing in two parts provided with cutting-plates with multiple cutting edges.

In another form of construction the wall of the casing of the lever $a$, Figs. 12 and 13, could be provided with an outer screw-thread, while that of the casing of the lever $b$ would have an internal thread, Figs. 10 and 11. The cutters $e$ are shaped as indicated above and are maintained in fixed position with regard to the casings by means of the securing parts $f$. Figs. 1 and 2 show this second form of construction.

Having now particularly described and ascertained the nature of my said invention and in what manner the same is to be performed, I declare that what I claim is—

1. In a wire-cutting or other similar tool, the combination of two pivotally-connected members, cutters carried the one by the one and the other by the other of said members, each cutter having a plurality of openings formed with cutting edges, and means, engaging each cutter in one of said openings, for securing said cutter in the corresponding member, substantially as described.

2. The combination of two members having the one a circular recess and the other a corresponding circular projection fitted into said recess, said projection and recess forming a pivoting connection between said members, and cutters secured the one in the recess of one member and the other against the opposed portion of the other member, said members having openings adjacent the cutting edges of their cutters, substantially as described.

In testimony whereof I have signed this specification in the presence of two subscribing witnesses.

EDOUARD BAARTMANS.

Witnesses:
JEAN HENAUT,
HENRI WARREN.